United States Patent
Liu

(10) Patent No.: US 11,556,093 B2
(45) Date of Patent: Jan. 17, 2023

(54) METHOD AND DEVICE FOR CALIBRATING A LIGHT SMART WATCH, AND LIGHT SMART WATCH

(71) Applicant: GOERTEK TECHNOLOGY CO., LTD., Shandong Province (CN)

(72) Inventor: Xun Liu, Shandong Province (CN)

(73) Assignee: GOERTEK TECHNOLOGY CO., LTD., Shandong Province (CN)

(*) Notice: Subject to any disclaimer, the term of this patent is extended or adjusted under 35 U.S.C. 154(b) by 443 days.

(21) Appl. No.: 16/632,819

(22) PCT Filed: Nov. 8, 2017

(86) PCT No.: PCT/CN2017/109905
§ 371 (c)(1),
(2) Date: Jan. 21, 2020

(87) PCT Pub. No.: WO2019/019475
PCT Pub. Date: Jan. 31, 2019

(65) Prior Publication Data
US 2021/0048784 A1 Feb. 18, 2021

(30) Foreign Application Priority Data
Jul. 26, 2017 (CN) .......................... 201710618971.6

(51) Int. Cl.
*H03D 3/24* (2006.01)
*G04D 7/00* (2006.01)
(Continued)

(52) U.S. Cl.
CPC ............. *G04D 7/003* (2013.01); *G04R 20/14* (2013.01); *G06F 1/163* (2013.01)

(58) Field of Classification Search
CPC ........ G04D 7/003; G04R 20/14; G04R 20/00; G06F 1/163; G06F 3/0446; G04G 19/12
(Continued)

(56) References Cited

U.S. PATENT DOCUMENTS

2007/0268786 A1* 11/2007 Gallet .................... G04R 20/00
368/157
2017/0154566 A1* 6/2017 Ryoo .................. H01L 27/3276
(Continued)

FOREIGN PATENT DOCUMENTS

| CN | 1248332 A | 3/2000 |
|---|---|---|
| CN | 1354401 A | 6/2002 |

(Continued)

*Primary Examiner* — Phuong Phu
(74) *Attorney, Agent, or Firm* — LKGlobal | Lorenz & Kopf, LLP

(57) ABSTRACT

A method for calibrating a light smart watch includes: providing an FPC soft board under a dial, a size of the FPC soft board matching a size of the dial, the FPC soft board is divided into a plurality of partitions, each partition is insulated from other partitions, and each of watch hands and each partition form a capacitor in turn when the watch hands run; detecting a capacitance change amount of each partition, determining positions of partitions where the watch hands are currently located, and determining a current time indicated by the watch hands, according to the positions of partitions where the watch hands are currently located; comparing the current time indicated by the watch hands with a current time of a mobile terminal to determine a time error; and adjusting the watch hands, according to the time error to run in sync with the time of the mobile terminal.

10 Claims, 2 Drawing Sheets

(51) Int. Cl.
 *G04R 20/14* (2013.01)
 *G06F 1/16* (2006.01)
(58) Field of Classification Search
 USPC .......................................... 375/373, 354, 356
 See application file for complete search history.

(56) References Cited

U.S. PATENT DOCUMENTS

| | | | | |
|---|---|---|---|---|
| 2018/0039232 | A1* | 2/2018 | Abramov | G04G 19/12 |
| 2018/0260056 | A1* | 9/2018 | Chang | G06F 3/0446 |

FOREIGN PATENT DOCUMENTS

| | | |
|---|---|---|
| CN | 1567103 A | 1/2005 |
| CN | 102999235 A | 3/2013 |
| CN | 103995461 A | 8/2014 |
| CN | 104090483 A | 10/2014 |
| CN | 104503220 A | 4/2015 |
| CN | 105446130 A | 3/2016 |
| CN | 105527834 A | 4/2016 |
| CN | 105867109 A | 8/2016 |
| CN | 205581526 U | 9/2016 |
| CN | 107329397 A | 11/2017 |
| CN | 207096710 U | 3/2018 |
| JP | 2003315478 A | 11/2003 |
| JP | 2007051939 A | 3/2007 |

\* cited by examiner

| Providing an FPC soft board under a dial, wherein a size of the FPC soft board matches a size of the dial, the FPC soft board is divided into a plurality of partitions, each partition is insulated from other partitions, and each of watch hands and each partition form a capacitor in turn when the watch hands run | S11 |

↓

| Detecting a capacitance change amount of each partition, determining positions of partitions where the watch hands are currently located, and determining a current time indicated by the watch hands according to the positions of partitions where the watch hands are currently located | S12 |

↓

| Comparing the current time indicated by the watch hands with a current time of a mobile terminal to determine a time error | S13 |

↓

| Adjusting the watch hands according to the time error to run in sync with the time of the mobile terminal | S14 |

FIG. 1

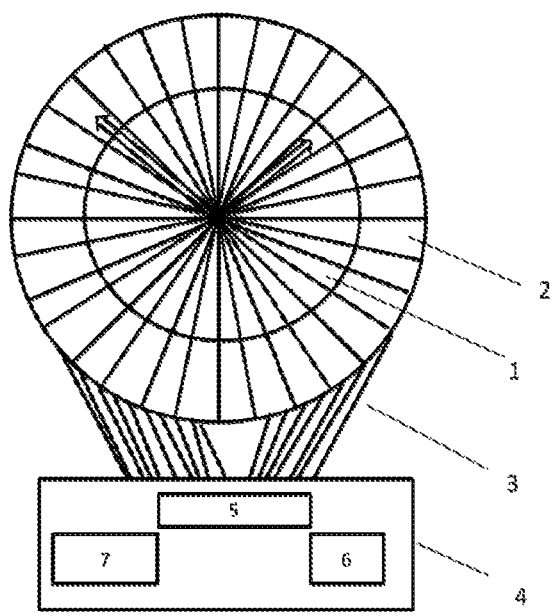

FIG. 2

METHOD AND DEVICE FOR CALIBRATING A LIGHT SMART WATCH, AND LIGHT SMART WATCH

CROSS-REFERENCE TO RELATED APPLICATION

This Application is a U.S. National-Stage entry under 35 U.S.C. § 371 based on International Application No. PCT/CN2017/109905, filed Nov. 8, 2017 which was published under PCT Article 21(2) and which claims priority to Chinese Application No. 201710618971.6, filed Jul. 26, 2017, which are all hereby incorporated herein in their entirety by reference.

TECHNICAL FIELD

This application pertains to the field of smart watches, and in particular, to a method and device for calibrating a light smart watch, and a light smart watch.

BACKGROUND

Nowadays, with the rapid development of smart wearable products, a transition product between a traditional quartz watch and a smart watch has appeared on the market, which is called a light smart watch. The main feature of this type of watch is that it is intelligent by including intelligent modules while the appearance of the traditional quartz watch remains. However, due to the problem of gearbox and internal size design, when the light smart watch needs to adjust the time, it is still required to manually adjust the watch hands to achieve precise time adjustment although it keeps in wireless communication with a mobile phone. The time error is accumulated when the light smart watch runs for a long time, and the positions of the watch hands cannot be determine by software and hardware, thus automatic calibration and time adjustment cannot be realized, which affects the user experience. In addition, other objects, desirable features and characteristics will become apparent from the subsequent summary and detailed description, and the appended claims, taken in conjunction with the accompanying drawings and this background.

SUMMARY

In order to solve the above problems, the present disclosure provides a method and device for calibrating a light smart watch, and a light smart watch.

According to an aspect of the present disclosure, a method for calibrating a light smart watch is provided, and the method comprises:

providing an FPC soft board under a dial, wherein a size of the FPC soft board matches a size of the dial, the FPC soft board is divided into a plurality of partitions, a quantity of the partitions is corresponding to a quantity of watch hands, each partition is divided into a plurality of sub-partitions, each partition is insulated from other partitions, each sub-partition is insulated from other sub-partitions, and a watch hand and each sub-partition in a partition corresponding to the watch hand form a capacitor in turn when the watch hand runs;

detecting a capacitance change amount of each sub-partition, determining positions of sub-partitions where the watch hands are currently located, and determining a current time indicated by the watch hands according to the positions of sub-partitions where the watch hands are currently located;

comparing the current time indicated by the watch hands with a current time of a mobile terminal to determine a time error; and adjusting the watch hands, according to the time error, to run in sync with the time of the mobile terminal.

The present disclosure further provides a device for calibrating a light smart watch, comprising:

an FPC soft board provided under a dial, wherein a size of the FPC soft board matches a size of the dial, the FPC soft board is divided into a plurality of partitions, a quantity of the partitions is corresponding to a quantity of watch hands, each partition is divided into a plurality of sub-partitions, each partition is insulated from other partitions, and each sub-partition is insulated from other sub-partitions, such that a watch hand and each sub-partition in a partition corresponding to the watch hand form a capacitor in turn when the watch hand runs;

a capacitance detecting port for collecting a capacitance signal of each sub-partition;

a communication unit for wirelessly communicating with a mobile terminal to acquire a current time of the mobile terminal, and/or, for receiving a calibration command transmitted from the mobile terminal, transmitting the current time indicated by the watch hands to the mobile terminal, and receiving a time error transmitted back from the mobile terminal after comparing the current time indicated by the watch hands with the current time of the mobile terminal; and a controller for acquiring the capacitance signal collected by the capacitance detecting port, analyzing a capacitance change amount corresponding to the capacitance signal to determine positions of sub-partitions where the watch hands are currently located, and determining a current time indicated by the watch hands according to the positions of sub-partitions where the watch hands are currently located; comparing the current time indicated by the watch hands with the current time of the mobile terminal acquired by the communication unit to determine a time error; and driving the watch hands, according to the determined time error or the time error received by the communication unit, to run in sync with the time of the mobile terminal.

The present disclosure further provides a light smart watch, comprising watch hands, a dial, a gearbox and a PCB hard board, wherein the light smart watch further comprises an FPC soft board, a capacitance detecting port, a communication unit and a controller;

the gearbox is for driving the watch hands to rotate;

the PCB hard board is for carrying the gearbox, the capacitance detecting port, the communication unit and the controller;

the FPC soft board is provided under the dial, wherein a size of the FPC soft board matches a size of the dial, the FPC soft board is divided into a plurality of partitions, a quantity of the partitions is corresponding to a quantity of watch hands, each partition is divided into a plurality of sub-partitions, each partition is insulated from other partitions, and each sub-partition is insulated from other sub-partitions, such that a watch hand and each sub-partition in a partition corresponding to the watch hand form a capacitor in turn when the watch hand runs;

the capacitance detecting port is for collecting a capacitance signal of each sub-partition;

the communication unit is for wirelessly communicating with a mobile terminal to acquire a current time of the mobile terminal, and/or, for receiving a calibration command transmitted from the mobile terminal, transmitting the current time indicated by the watch hands to the mobile terminal, and receiving a time error transmitted back from the mobile terminal after comparing the current time indicated by the watch hands with the current time of the mobile terminal; and the controller is for acquiring the capacitance signal collected by the capacitance detecting port, analyzing a capacitance change amount corresponding to the capacitance signal to determine positions of sub-partitions where the watch hands are currently located, and determining a current time indicated by the watch hands according to the positions of sub-partitions where the watch hands are currently located; comparing the current time indicated by the watch hands with the current time of the mobile terminal acquired by the communication unit to determine a time error; and driving the watch hands, according to the determined time error or the time error received by the communication unit, to run in sync with the time of the mobile terminal.

The present disclosure provides an FPC soft board under a dial of the light smart watch, the size of the FPC soft board matches the size of the dial, the FPC soft board is divided into a plurality of partitions, a quantity of the partitions is corresponding to a quantity of watch hands, each partition is divided into a plurality of sub-partitions, each partition is insulated from other partitions, each sub-partition is insulated from other sub-partitions, and a watch hand and each sub-partition in a partition corresponding to the watch hand form a capacitor in turn when the watch hand runs; it detects a capacitance change amount of each sub-partition, determines positions of sub-partitions where the watch hands are currently located, and determines a current time indicated by the watch hands according to the positions of sub-partitions where the watch hands are currently located; it compares the current time indicated by the watch hands with a current time of a mobile terminal to determine a time error, and adjusts the watch hands according to the time error to run in sync with the time of the mobile terminal. This calibrating method solves the problem of the light smart watch that the watch hands cannot be positioned and must be calibrated manually, realizes automatic calibration and time adjustment without affecting the product appearance and incurring additional power consumption, and can be implemented with a low cost and can efficiently and accurately solve the bottleneck problem in the field of light smart watches, thereby facilitating the product promotion and improving the user experience.

BRIEF DESCRIPTION OF DRAWINGS

The present invention will hereinafter be described in conjunction with the following drawing figures, wherein like numerals denote like elements, and:

FIG. 1 is a flowchart of a method for calibrating a light smart watch according to an embodiment of the present disclosure;

FIG. 2 is a schematic diagram of detection of watch hand positions according to an embodiment of the present disclosure;

DETAILED DESCRIPTION

Figure 3:
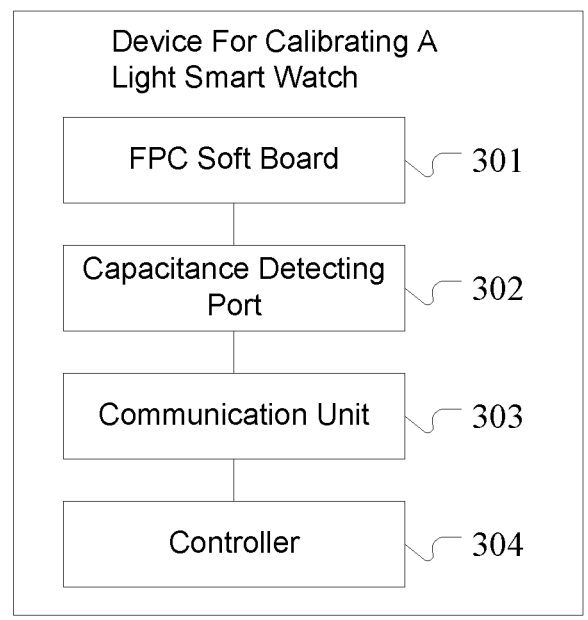
FIG. 3 is a diagram of a device for calibrating a light smart watch according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

In order to make the objects, technical solutions and advantages of the present disclosure clearer, the embodiments of the present disclosure will be further described in detail with reference to the accompanying drawings.

In the following description with reference to the accompanying drawings, like reference numerals in different drawings refer to the same or similar elements unless otherwise indicated. The embodiments described in the following exemplary embodiments do not represent all embodiments consistent with the present disclosure. Instead, they are merely examples of devices and methods consistent with some aspects of the present disclosure as detailed in the appended claims.

The terminology used herein is for the purpose of describing particular embodiments only and is not intended to limit the present disclosure. As used in the description and claims herein, the singular forms "a", "an", and "the" are intended to include the plural form as well, unless the context clearly indicates otherwise.

FIG. 1 is a flowchart of a method for calibrating a light smart watch according to an embodiment of the present disclosure. As shown in FIG. 1, the method comprises the following steps:

Step S11: providing an FPC soft board under a dial, wherein a size of the FPC soft board matches a size of the dial, the FPC soft board is divided into a plurality of partitions, a quantity of the partitions is corresponding to a quantity of watch hands, each partition is divided into a plurality of sub-partitions, each partition is insulated from other partitions, each sub-partition is insulated from other sub-partitions, and a watch hand and each sub-partition in a partition corresponding to the watch hand form a capacitor in turn when the watch hand runs;

Step S12: detecting a capacitance change amount of each sub-partition, determining positions of sub-partitions where the watch hands are currently located, and determining a current time indicated by the watch hands according to the positions of sub-partitions where the watch hands are currently located;

Step S13: comparing the current time indicated by the watch hands with a current time of a mobile terminal to determine a time error; and Step S14: adjusting the watch hands, according to the time error, to run in sync with the time of the mobile terminal.

In some embodiments, in step S12, "detecting a capacitance change amount of each sub-partition and determining positions of sub-partitions where the watch hands are currently located" is specifically: acquiring a capacitance signal of each sub-partitions collected by the capacitance detecting port; analyzing the capacitance signal to obtain the capacitance change amount of each sub-partition; when it is detected that a capacitance change amount of a certain sub-partition is greater than a preset capacitance threshold, determining that the hour hand or the minute hand runs to a position corresponding to the certain sub-partition.

In some embodiments, step S13 is specifically: detecting the positions of sub-partitions where the watch hands are located and determining the current time indicated by the watch hands at a predetermined time interval, acquiring simultaneously the current time of the mobile terminal via a communication module of the watch, and comparing the current time indicated by the watch hands with the current time of the mobile terminal to determine a time error;

and/or whenever a calibration command transmitted from a mobile terminal is received, detecting the positions of sub-partitions where the watch hands are located, determining the current time indicated by the watch hands, transmitting the current time indicated by the watch hands to the mobile terminal via a communication module of the watch, and receiving a time error transmitted back from the mobile terminal after comparing the current time indicated by the watch hands with the current time of the mobile terminal.

In some embodiments, step S14 is specifically: if the current time indicated by the watch hands is slower than the current time of the mobile terminal, controlling to output an increased quantity of forward excitation waveforms to adjust the watch hands to run forwardly till in sync with the time of the mobile terminal; and if the current time indicated by the watch hands is faster than the current time of the mobile terminal, controlling to output a reduced quantity of forward excitation waveforms or controlling to output one or more backward excitation waveforms to adjust the watch hands to run backwardly till in sync with the time of the mobile terminal.

In some embodiments, the FPC soft board is bent inside the watch to connect a PCB hard board of the watch; the watch hands comprise an hour hand and a minute hand; the FPC soft board is divided into an inner-layer partition corresponding to the hour hand and an outer-layer partition corresponding to the minute hand; the inner-layer partition and the outer-layer partition are respectively divided evenly into a plurality of sub-partitions according to operating parameters of a watch gearbox, a width and a running interval of the watch hand; each sub-partition is electrically connected to a capacitance detecting port of the PCB hard board, respectively.

From the perspective of appearance design, the light smart watch is not much different from a traditional quartz watch. Without affecting the appearance, an FPC soft board is provided under the dial of the light smart watch, and the size of the FPC soft board matches the size of the dial. The FPC soft board has a special design of partitions, as shown in FIG. 2. FIG. 2 is a schematic diagram of position detection of the watch hands according to an embodiment of the present disclosure. The watch hands comprise an hour hand and a minute hand. The detection area of the FPC soft board comprises an inner-layer partition 1 and an outer-layer partition 2, and the FPC soft board is connected to a PCB hard board area 4 via a FPC bending area 3. The PCB hard board area 4 comprises a capacitance detecting port 5, a controller 6, and a communication unit 7.

As for the so-called partition design, firstly, the FPC soft board is divided into two concentric circles according to the lengths of the hour hand and the lengths of the minute hand, among which the hour hand corresponds to the inner circle, i.e., the inner-layer partition, and the inner-layer partition is used to detect the position of the hour hand, and the minute hand corresponds to the ring excluding the inner circle, i.e., the outer-layer partition, and the outer-layer partition is used to detect the position of the minute hand. Secondly, the inner-layer partition and the outer-layer partition are divided into a plurality of sub-partitions according to the operating parameters of the gearbox, and the widths and the running interval of the watch hands, so as to make sure that each of the hour and minute hands falls within different sub-partitions at each move. The operating parameters of the gearbox mainly refer to the angle at which the gearbox rotates at each move. For example, considering the widths and the running interval of the watch hands, usually the watch gearbox controls the minute hand to rotate an angle of 3° at each move, and correspondingly the outer-layer partition may be divided into 120 sub-partitions. The watch gearbox controls the hour hand to rotate an angle of 2° at each move, and correspondingly the inner-layer partition may be divided into 180 sub-partitions.

The inner-layer partition and the outer-layer partition are insulated from each other, and each sub-partition is insulated from other sub-partitions. Each sub-partition is provided with a wire connected to the capacitance detecting port of the PCB hard board area via the FPC bending area. Each sub-partition is filled with a copper sheet or other metal materials. When the watch hand moves to a sub-partition, since there is a gap between the watch hands and the sub-partitions and they are both metal materials, the two parts can be equivalent to a capacitor and constitute, together with the wire and the power supply, an equivalent circuit. When the capacitor is charged for a short time, its own capacitance and voltage value rise from 0 to the current capacitance value. The capacitance detecting port collects the capacitance signal of the equivalent capacitor, and the controller in the watch acquires the capacitance signal via the capacitance detecting port and analyzes the corresponding capacitance change amount. In order to eliminate the error caused by external factors, a capacitance threshold is set in advance. When the capacitance change amount of a certain sub-partition is greater than the preset capacitance threshold, it is determined that the watch hand is running in the sub-partition. The current time indicated by the watch hands is determined according to the positions of sub-partitions where the watch hands are located.

When the light smart watch is not connected to a mobile terminal such as a smart mobile phone, the light smart watch may be set to automatically detect the positions of partitions where the watch hands are located whenever the watch runs for one hour (as an example). After the current time indicated by the watch hands is determined, the current time of the mobile phone is acquired via a communication unit such as a Bluetooth channel between the watch and the mobile phone. The current time indicated by the watch hands is compared with the current time of the mobile phone to analyze and determine the time error. That is, the time error is obtained by subtracting the current time of the mobile phone from the current time indicated by the watch hands. If the time error is negative, it is determined that the current time indicated by the watch hands is slower than the current time of the mobile phone. If the time error is positive, it is determined that the current time indicated by the watch hands is faster than the current time of the mobile phone. If the time error is zero, it is determined that the current time indicated by the watch hands is consistent with the current time of the mobile phone.

When the current time indicated by the watch hands is slower than the current time of the mobile phone, during the rotation of the watch hands, the controller in the watch controls to output an increased quantity of forward excitation waveforms, thereby controlling the rotation speed of the gearbox to increase so that the watch hands run in sync with the current time of the mobile phone. When the current time indicated by the watch hands is faster than the current time of the mobile phone, the controller in the watch controls to output a reduced quantity of forward excitation waveforms, thereby controlling the rotation speed of the gearbox to decrease so that the watch hands run forwardly till in sync with the current time of the mobile phone; alternatively, the controller in the watch controls to output one or more backward excitation waveforms, thereby controlling the gearbox to run reversely, so that the watch hands run backwardly till in sync with the current time of the mobile phone.

When the light smart watch is connected to a mobile terminal such as a smart mobile phone, whenever the controller at the watch end receives a calibration command transmitted by the mobile phone end, it acquires the capacitance change amount of each sub-partition via the capacitance detecting port, and determines the positions of sub-partitions where the watch hands are located, thereby determining the current time indicated by the watch hands. The current time indicated by the watch hands is transmitted to the mobile phone end via the communication unit such as a Bluetooth channel between the watch and the mobile phone, and the mobile phone end compares the current time indicated by the watch hands with the current time of the mobile phone to determine the time error. If the time error is not zero, the mobile phone end transmits back the time error to the watch via the communication unit such as a Bluetooth channel between the watch and the mobile phone. Similarly, the controller in the watch, according to the time error, drives the watch hands to run in sync with the current time of the mobile phone by controlling the output mode of the excitation waveform.

FIG. 3 is a diagram of a device for calibrating a light smart watch according to an embodiment of the present disclosure. As shown in FIG. 3, the device comprises:

an FPC soft board 301 provided under a dial, wherein a size of the FPC soft board matches a size of the dial, the FPC soft board is divided into a plurality of partitions, a quantity of the partitions is corresponding to a quantity of watch hands, each partition is divided into a plurality of sub-partitions, each partition is insulated from other partitions, and each sub-partition is insulated from other sub-partitions, such that a watch hand and each sub-partition in a partition corresponding to the watch hand form a capacitor in turn when the watch hand runs;

a capacitance detecting port 302 for collecting a capacitance signal of each sub-partition;

a communication unit 303 for wirelessly communicating with a mobile terminal to acquire a current time of the mobile terminal, and/or, for receiving a calibration command transmitted from the mobile terminal, transmitting the current time indicated by the watch hands to the mobile terminal, and receiving a time error transmitted back from the mobile terminal after comparing the current time indicated by the watch hands with the current time of the mobile terminal; and a controller 304 for acquiring the capacitance signal collected by the capacitance detecting port 302, analyzing a capacitance change amount corresponding to the capacitance signal to determine positions of sub-partitions where the watch hands are currently located, and determining a current time indicated by the watch hands according to the positions of sub-partitions where the watch hands are currently located; comparing the current time indicated by the watch hands with the current time of the mobile terminal acquired by the communication unit 303 to determine a time error; and driving the watch hands, according to the determined time error or the time error received by the communication unit 303, to run in sync with the time of the mobile terminal.

The controller 304 acquires the capacitance signal of each sub-partition collected by the capacitance detecting port 302; analyzes the capacitance signal to obtain a capacitance change amount of each sub-partition; when it is detected that a capacitance change amount of a certain sub-partition is greater than a preset capacitance threshold, determines that the hour hand or the minute hand runs to a position corresponding to the certain sub-partition.

One way to acquire the time error is that the controller 304 acquires the current time of the mobile terminal via the communication unit 303 of the watch, compares the current time indicated by the watch hands with the current time of the mobile terminal, and determines the time error. When the current time indicated by the watch hands is slower than the current time of the mobile terminal, the controller 304 controls to output an increased quantity of forward excitation waveforms to adjust the watch hands to run forwardly till in sync with the time of the mobile terminal. When the current time indicated by the watch hands is faster than the current time of the mobile terminal, the controller 304 controls to output a reduced quantity of forward excitation waveforms or controls to output one or more backward excitation waveforms to adjust the watch hands to run backwardly till in sync with the time of the mobile terminal.

Another way to acquire the time error is that the controller 304 transmits the current time indicated by the watch hands to the mobile terminal via the communication unit 303 of the watch, receives the time error transmitted back by the mobile terminal after comparing the current time indicated by the watch hands with the current time of the mobile terminal, and similarly, drives the watch hands to run in sync with the current time of the mobile phone by controlling the output mode of the excitation waveform.

The watch hands comprise an hour hand and a minute hand. The FPC soft board 301 is bent inside the watch to connect a PCB hard board of the watch. The FPC soft board 301 is divided into an inner-layer partition corresponding to the hour hand and an outer-layer partition corresponding to the minute hand. The inner-layer partition and the outer-layer partition are respectively divided evenly into a plurality of sub-partitions according to operating parameters of a watch gearbox, a width and a running interval of the watch hand. Each sub-partition is electrically connected to a capacitance detecting port 302 of the PCB hard board, respectively.

Figure 4:
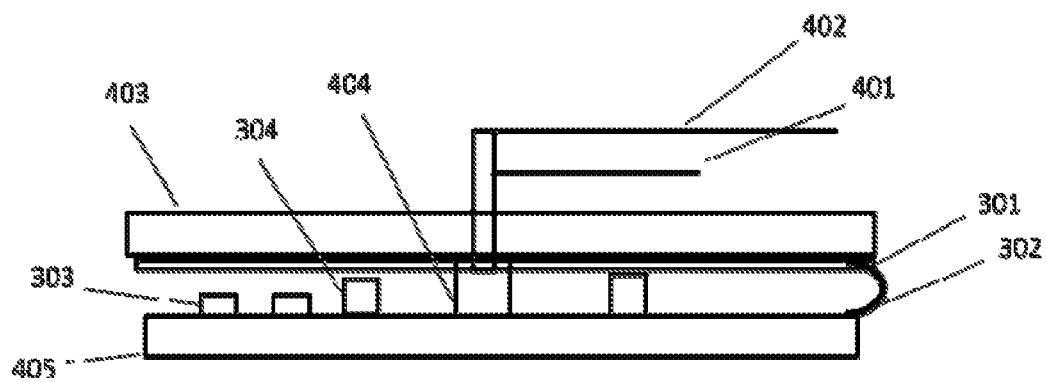
FIG. 4 is a side view of a light smart watch according to an embodiment of the present disclosure.

FIG. 4 is a side view of a light smart watch according to an embodiment of the present disclosure, which comprises an hour hand 401, a minute hand 402, a dial 403, a gearbox 404, a PCB hard board 405, an FPC soft board 301, a capacitance detecting port 302, a communication unit 303 and a controller 304.

The gearbox 404 is for driving the hour hand 401 and the minute hand 402 to rotate.

The PCB hard board 405 is for carrying the gearbox 404, the capacitance detecting port 302, the communication unit 303, and the controller 304.

The FPC soft board 301 is provided under the dial, and has a size matching the size of the dial. The FPC soft board 301 is divided into a plurality of partitions, a quantity of the partitions is corresponding to a quantity of watch hands, each partition is divided into a plurality of sub-partitions, each partition is insulated from other partitions, and each sub-partition is insulated from other sub-partitions, such that the hour hand 401 and the minute hand 402 and each partition form a capacitor in turn when the hour hand 401 and the minute hand 402 rotate.

The capacitance detecting port 302 is for collecting a capacitance signal of each sub-partition.

The communication unit 303 is for wirelessly communicating with a mobile terminal to acquire a current time of the mobile terminal, and/or, for receiving a calibration command transmitted from the mobile terminal, transmitting the current time indicated by the watch hands to the mobile terminal, and receiving a time error transmitted back from the mobile terminal after comparing the current time indicated by the watch hands with the current time of the mobile terminal.

The controller 304 is for acquiring the capacitance signal collected by the capacitance detecting port 302, analyzing a capacitance change amount corresponding to the capacitance signal to determine positions of sub-partitions where the watch hands are currently located, and determining a current time indicated by the watch hands according to the positions of the sub-partitions where the hour hand 401 and the minute hand 402 are currently located; comparing the current time indicated by the watch hands with the current time of the mobile terminal acquired by the communication unit 303 to determine a time error; and driving the hour hand 401 and the minute hand 402, according to the determined time error or the time error received by the communication unit 303, to run in sync with the time of the mobile terminal.

The controller 304 acquires the capacitance signal of each sub-partition collected by the capacitance detecting port 302; analyzes the capacitance signal to obtain the capacitance change amount of each sub-partition; when it is detected that a capacitance change amount of a certain sub-partition is greater than a preset capacitance threshold, determines that the hour hand 401 or the minute hand 402 run to a position corresponding to the certain sub-partition, thereby determining the current time indicated by the watch hands.

The controller 304 acquires the current time of the mobile terminal via the communication unit 303 of the watch, compares the current time indicated by the watch hands with the current time of the mobile terminal, and determines the time error. When the current time indicated by the watch hands is slower than the current time of the mobile terminal, the controller 304 controls to output an increased quantity of forward excitation waveforms to adjust the hour hand 401 and the minute hand 402 to run in sync with the time of the mobile terminal. If the current time indicated by the watch hands is faster than the current time of the mobile terminal, the controller 304 controls to output a reduced quantity of forward excitation waveforms or controls to output one or more backward excitation waveforms to adjust the hour hand 401 and the minute hand 402 to run backwardly till in sync with the time of the mobile terminal.

Additionally or alternatively, the controller 304 transmits the current time indicated by the watch hands to the mobile terminal via the communication unit 303 of the watch, receives the time error transmitted back by the mobile terminal after comparing the current time indicated by the watch hands with the current time of the mobile terminal, and similarly, drives the watch hands to run in sync with the current time of the mobile phone by controlling the output mode of the excitation waveform.

The FPC soft board 301 is bent inside the watch to connect the PCB hard board 405 of the watch. The FPC soft board 301 is divided into an inner-layer partition corresponding to the hour hand and an outer-layer partition corresponding to the minute hand. The inner-layer partition and the outer-layer partition are respectively divided evenly into a plurality of sub-partitions according to an operating parameters of a watch gearbox, a width and a running interval of the watch hand. Each sub-partition is electrically connected to a capacitance detecting port 302 of the PCB hard board 405 of the watch, respectively.

The device embodiments substantially correspond to the method embodiments, and the related contents may refer to the description of the method embodiments. The device embodiments described above are merely illustrative, and some or all of the modules may be selected according to actual needs to achieve the objectives of the embodiments. Those of ordinary skill in the art can understand and implement them without paying any creative effort.

The present disclosure provides an FPC soft board under a dial of the light smart watch, the size of the FPC soft board matches the size of the dial, the FPC soft board is divided into a plurality of partitions, a quantity of the partitions is corresponding to a quantity of watch hands, each partition is divided into a plurality of sub-partitions, each partition is insulated from other partitions, each sub-partition is insulated from other sub-partitions, and a watch hand and each sub-partition in a partition corresponding to the watch hand form a capacitor in turn when the watch hand runs; it detects a capacitance change amount of each sub-partition, determines the positions of sub-partitions where the watch hands are currently located, and determines a current time indicated by the watch hands according to the positions of sub-partitions where the watch hands are currently located; it compares the current time indicated by the watch hands with a current time of a mobile terminal to determine a time error, and adjusts the watch hands according to the time error to run in sync with the time of the mobile terminal by controlling the output mode of the excitation waveform. Thus, the present disclosure realizes the detection of the capacitance change by adopting the unique partition design of the FPC soft board as well as the combined structure of the soft and hard boards, and cooperating with the watch hands, thereby determining the positions of the watch hands, realizing automatic calibration and synchronous calibration of the watch time, and solving the problem of the light smart watch that the watch hands cannot be positioned and must be calibrated manually. As it is designed that the FPC soft board is bent inside the watch to connect the PCB hard board of the watch, the appearance of the product will not be affected, and the power consumption will not be increased additionally. The solutions of the present disclosure can be implemented with a low cost and can efficiently and accurately solve the bottleneck problem in the field of light smart watches, which is beneficial to product promotion and user experience enhancement.

The above merely describes particular embodiments of the present disclosure. By the teaching of the present disclosure, a person skilled in the art can make other modifications or variations based on the above embodiments. A person skilled in the art should appreciate that, the detailed description above is merely for the purpose of better explaining the present disclosure, and the protection scope of the present disclosure should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for calibrating a light smart watch, comprising:
   providing an FPC soft board under a dial, wherein a size of the FPC soft board matches a size of the dial, the FPC soft board is divided into a plurality of partitions, a quantity of the partitions is corresponding to a quantity of watch hands, each partition is divided into a plurality of sub-partitions, each partition is insulated from other partitions, each sub-partition is insulated from other sub-partitions, and a watch hand and each sub-partition in a partition corresponding to the watch hand form a capacitor in turn when the watch hand runs;
   detecting a capacitance change amount of each sub-partition, determining positions of sub-partitions where the watch hands are currently located, and determining a current time indicated by the watch hands according to the positions of sub-partitions where the watch hands are currently located;
   comparing the current time indicated by the watch hands with a current time of a mobile terminal to determine a time error; and
   adjusting the watch hands, according to the time error, to run in sync with the time of the mobile terminal.

2. The method according to claim 1, wherein
   the FPC soft board is bent inside the watch to connect a PCB hard board of the watch;
   the watch hands comprise an hour hand and a minute hand;
   the FPC soft board is divided into an inner-layer partition corresponding to the hour hand and an outer-layer partition corresponding to the minute hand;
   the inner-layer partition and the outer-layer partition are respectively divided evenly into a plurality of sub-partitions according to operating parameters of a watch gearbox, a width and a running interval of the watch hands; and
   each sub-partition is electrically connected to a capacitance detecting port of the PCB hard board, respectively.

3. The method of claim 2, wherein detecting a capacitance change amount of each sub-partition and determining positions of sub-partitions where the watch hands are currently located comprises:
   acquiring a capacitance signal of each sub-partition collected by the capacitance detecting port;
   analyzing the capacitance signal to obtain a capacitance change amount of each sub-partition; and
   when it is detected that a capacitance change amount of a certain sub-partition is greater than a preset capacitance threshold, determining that the hour hand or the minute hand runs to a position corresponding to the certain sub-partition.

4. The method according to claim 1, wherein comparing the current time indicated by the watch hands with a current time of a mobile terminal to determine a time error comprises:
   detecting the positions of sub-partitions where the watch hands are located and determining the current time indicated by the watch hands at a predetermined time interval, acquiring simultaneously a current time of a mobile terminal via a communication module of the watch, and comparing the current time indicated by the watch hands with the current time of the mobile terminal to determine a time error;
   and/or
   whenever a calibration command transmitted from a mobile terminal is received, detecting the positions of sub-partitions where the watch hands are located and determining the current time indicated by the watch hand, transmitting the current time indicated by the watch hands to the mobile terminal via a communication module of the watch, and receiving a time error transmitted back from the mobile terminal after comparing the current time indicated by the watch hands with the current time of the mobile terminal.

5. The method according to claim 1, wherein adjusting the watch hands according to the time error to run in sync with the time of the mobile terminal comprises:
   if the current time indicated by the watch hands is slower than the current time of the mobile terminal, controlling to output an increased quantity of forward excitation waveforms to adjust the watch hands to run forwardly till in sync with the time of the mobile terminal; and
   if the current time indicated by the watch hands is faster than the current time of the mobile terminal, controlling to output a reduced quantity of forward excitation waveforms or controlling to output one or more backward excitation waveforms to adjust the watch hands to run backwardly till in sync with the time of the mobile terminal.

6. A device for calibrating a light smart watch, comprising:
   an FPC soft board provided under a dial, wherein a size of the FPC soft board matches a size of the dial, the FPC soft board is divided into a plurality of partitions, a quantity of the partitions is corresponding to a quantity of watch hands, each partition is divided into a plurality of sub-partitions, each partition is insulated from other partitions, and each sub-partition is insulated from other sub-partitions, such that a watch hand and each sub-partition in a partition corresponding to the watch hand form a capacitor in turn when the watch hand runs;
   a capacitance detecting port for collecting a capacitance signal of each sub-partition;
   a communication unit for wirelessly communicating with a mobile terminal; and
   a controller for acquiring the capacitance signal collected by the capacitance detecting port, analyzing a capacitance change amount corresponding to the capacitance signal to determine positions of sub-partitions where the watch hands are currently located, and determining a current time indicated by the watch hands according to the positions of sub-partitions where the watch hands are currently located; acquiring a current time of the mobile terminal via the communication unit, and comparing the current time indicated by the watch hands with the current time of the mobile terminal acquired by the communication unit to determine a time error, and/or receiving a time error transmitted back from the mobile terminal via the communication unit; and driving the watch hands, according to the determined time error or the time error transmitted back from the mobile terminal, to run in sync with the time of the mobile terminal.

7. The device according to claim 6, wherein
the watch hands comprise an hour hand and a minute hand;
the FPC soft board is divided into an inner-layer partition corresponding to the hour hand and an outer-layer partition corresponding to the minute hand;
the inner-layer partition and the outer-layer partition are respectively divided evenly into a plurality of sub-partitions according to operating parameters of a watch gearbox, a width and a running interval of the watch hands; and
each sub-partition is electrically connected to a capacitance detecting port of a PCB hard board of the watch, respectively.

8. The device according to claim 6, wherein the FPC soft board is bent inside the watch to connect a PCB hard board of the watch.

9. A light smart watch, comprising watch hands, a dial, a gearbox and a PCB hard board, wherein the light smart watch further comprises an FPC soft board, a capacitance detecting port, a communication unit and a controller;
the gearbox is for driving the watch hands to rotate;
the PCB hard board is for carrying the gearbox, the capacitance detecting port, the communication unit and the controller;
the FPC soft board is provided under the dial, wherein a size of the FPC soft board matches a size of the dial, the FPC soft board is divided into a plurality of partitions, a quantity of the partitions is corresponding to a quantity of watch hands, each partition is divided into a plurality of sub-partitions, each partition is insulated from other partitions, and each sub-partition is insulated from other sub-partitions, such that a watch hand and each sub-partition in a partition corresponding to the watch hand form a capacitor in turn when the watch hand runs;
the capacitance detecting port is for collecting a capacitance signal of each sub-partition;
the communication unit is for wirelessly communicating with a mobile terminal; and
the controller is for acquiring the capacitance signal collected by the capacitance detecting port, analyzing a capacitance change amount corresponding to the capacitance signal to determine positions of sub-partitions where the watch hands are currently located, and determining a current time indicated by the watch hands according to the positions of sub-partitions where the watch hands are currently located; acquiring a current time of the mobile terminal via the communication unit, and comparing the current time indicated by the watch hands with the current time of the mobile terminal acquired by the communication unit to determine a time error, and/or, receiving a time error transmitted back from the mobile terminal via the communication unit; and driving the watch hands, according to the determined time error or the time error transmitted back from the mobile terminal, to run in sync with the time of the mobile terminal.

10. The light smart watch according to claim 9, wherein
the FPC soft board is bent inside the watch to connect the PCB hard board of the watch;
the watch hands comprise an hour hand and a minute hand;
the FPC soft board is divided into an inner-layer partition corresponding to the hour hand and an outer-layer partition corresponding to the minute hand;
the inner-layer partition and the outer-layer partition are respectively divided evenly into a plurality of sub-partitions according to operating parameters of a watch gearbox, a width and a running interval of the watch hands; and
each sub-partition is electrically connected to a capacitance detecting port of the PCB hard board, respectively.

* * * * *